INVENTOR.
THOMAS E. BAN

United States Patent Office 3,433,859
Patented Mar. 18, 1969

3,433,859
PROCESS FOR THE PREPARATION OF HARDENED, DENSE HEAT TRANSFER MEDIUM
Thomas E. Ban, Cleveland, Ohio, assignor to McDowell-Wellman Engineering Company, a corporation of Ohio
Filed Feb. 21, 1966, Ser. No. 528,853
U.S. Cl. 264—44      5 Claims
Int. Cl. B29h 7/20, 19/00

ABSTRACT OF THE DISCLOSURE

There is provided a hardened, dense heat transfer medium formed from spent shale particles by a process including the steps of sintering the particles, crushing the sintered particles, pelletizing, and indurating the pelletized sintered material.

---

Figure 1:
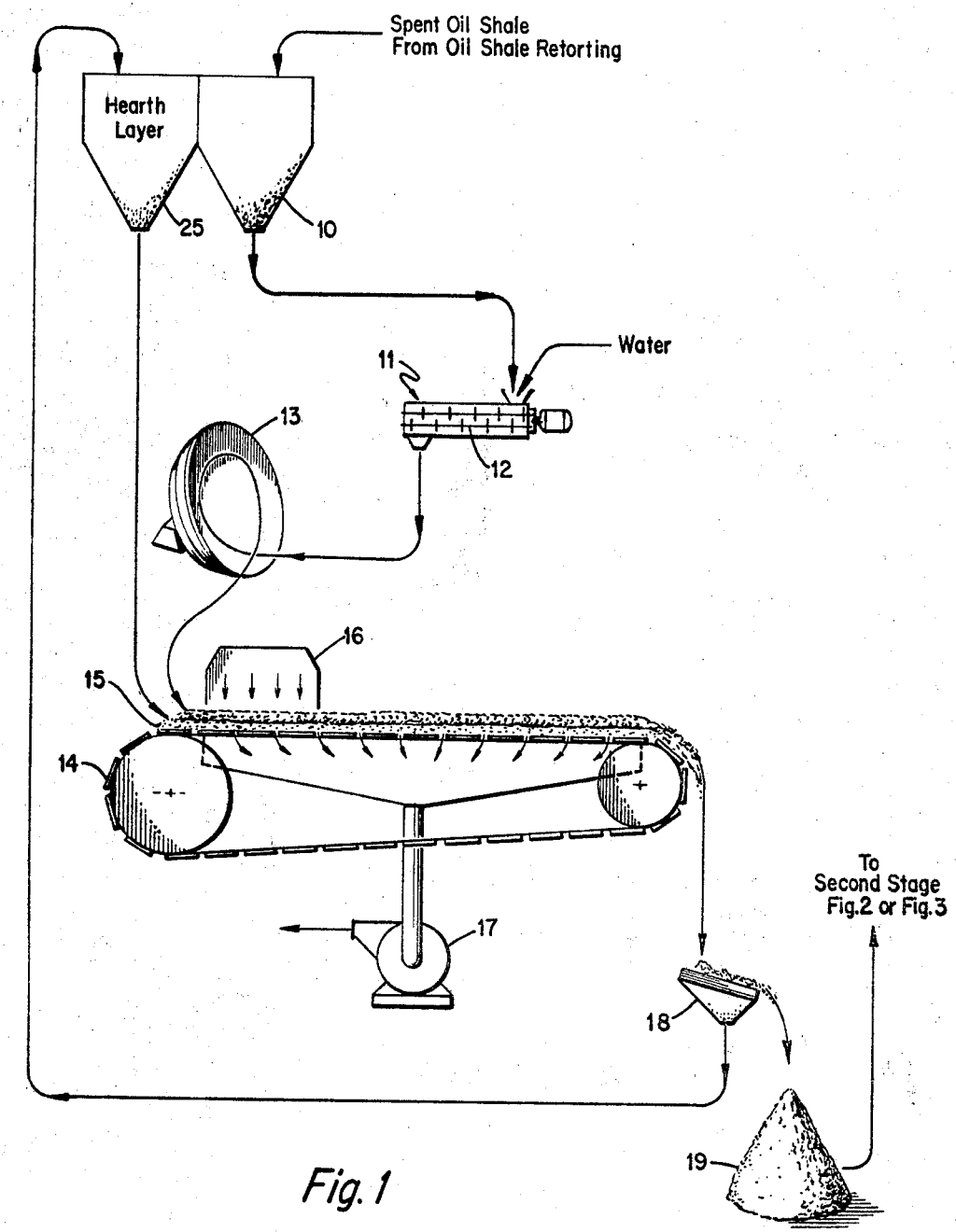

This invention relates, as indicated, to the manufacture of a heat transfer medium, and more particularly to a refractory medium which is formed from a waste material available in abundant quantities, the resultant heat transfer medium being useful especially in the removal of useful products from a mineral material which produces the aforesaid waste material. Particular reference is had to carbon-containing, and more particularly oil-bearing, mineral materials such as oil shale, from which shale oil is produced by retorting or other thermal oil eduction methods.

In recent years considerable interest has been developed in hydrocarbonaceous deposits including asphaltum, tar sand, coal, both bituminous and anthracite, oil sands, oil shale, and the like. One of the processes for recovering hydrocarbonaceous products from these natural resources contemplates the application of heat to a burden, which is either static or moving, composed of the mineral from which the organic components are to be removed by volatilization. In this process, ceramic bodies, for example balls, are heated to a high temperature and admixed with the organic material-bearing substance, e.g. crushed oil shale, and by conduction for the most part, radiation, and some convection, heat is transferred to the organic material-bearing substance in an amount sufficient to cause the organic constituents to be separated as a gas or mist from the material, to leave behind the naturally occurring inorganic matrix. Partial decomposition of organic constituents is frequently encountered.

After exposure to such heat transfer medium for a period of time sufficient to educt an economical proportion of the entrapped organic material which is removed from the retort or shaft furnace by suitable conduit means, the practice has been to recover the heat transfer medium by submitting the composite composed of the spent naturally occurring matrix, e.g. sand, oil-depleted shale (spent shale), coke, etc., and the ceramic heat transfer bodies to a separation procedure. In the course of the heating and reheating of the heat transfer bodies, and in the course of mechanically handling the composite of the heat transfer bodies and the naturally occurring mineral material from which the organic constituents are to be recovered, the ceramic heat transfer bodies undergo thermal shock and are submitted to mechanical shock, resulting in spalling, fracturing, crushing and pulverizing, necessitating a high order of replacement for these relatively expensive heat transfer bodies.

It has now been found that a highly satisfactory expendable heat transfer body may be produced from the spent matrix, e.g. spent shale or coke, by a process which involves heating and crushing the spent inorganic matrix to form a dense, relatively inert granular material, pelletizing the granular material, and indurating the pellets to form dense heat transfer bodies.

In certain circumstances, the inorganic matrix will require preliminary heating and bloating prior to the crushing and pelletizing operation, for example, spent shale on heating to very high temperature has a tendency to "bloat." The bloating tendency is caused by the decomposition of hydrates and carbonates which volatilize at temperatures much above the temperatures required to educt desired organic components to form water vapor and $CO_2$. Another source of volatile matter occurs from the presence of metallic oxides, such as iron and manganese oxide, which oxides evolve gases under reducing conditions. Until this property of gassing has been removed, pelletizing prior to such an operation will result in a light cellular heat transfer body which is too porous and filled with voids to be as efficient a heat transfer medium as is normally desired. This light cellular mass is of low density and low thermal conductivity. Since both of these features are undesirable in a heat transfer medium, the procedure is to heat the spent shale to a temperature desirably at or above the temperature to which the material will ultimately be heated as a heat transfer body to produce a "bloated" or expanded shale; crushing the expanded shale to form a granular, bloated, spent shale; pelletizing the granular material to form pellets having a predetermined desired diameter in the range of from .25 inch to 2 inches or more, for example, in the presence of moisture and a binder; and then indurating the pelletized granular bloated spent shale to form hard discrete bodies useful as a heat transfer medium in processes depending upon the inclusion of such media to educt organic values from naturally occurring mineral materials.

The resultant bodies may be used in any such conventional procedures, for example, as described in Patent No. 3,020,209 dated Feb. 6, 1962 in place of the ceramic heat transfer media.

The resultant product can be produced for costs which are of the order of magnitude of $\frac{1}{200}$ of the cost of the conventional ceramic material. At such cost ratio the heat transfer medium is expendable and costly recovery procedures are unnecessary. Still further, the spent shale, or the spent matrix may then be used in the future production of heat transfer bodies by the procedure outlined above without requiring any separation procedure of further working on the spent burden because of the identity of the materials forming the composite, i.e. the heat transfer medium (e.g. an oil shale derivative) admixed with the spent matrix (e.g. spent oil shale matrix).

It can be seen, therefore, that a desirable feature of this invention is that the pelletized heat transfer body may have essentially the same composition as the inorganic matrix present in the naturally occurring hydrocarbonaceous material and are expendable or reuseable to suit the circumstances of the particular operation in which they are used.

This invention will be described in connection with its embodiment in oil shale heat transfer bodies, the process of making such oil shale heat transfer bodies, and the utilization of such bodies in the eduction of shale oil from oil shale, it being understood that the principles of this invention may be employed as well to other materials for similar purposes and to the achievement of similar desired results.

In the annexed drawings there is shown in diagrammatic form flow-sheets for the production of spent oil shale heat transfer bodies.

Briefly stated then the present invention is embodied in a process for the production of a heat transfer body formed from the inorganic matrix of a naturally occurring mineral containing recoverable hydrocarbonaceous material by a process which includes the steps of crushing said inorganic matrix to produce a granular material, pelletizing said granular material to form "discrete green" pellets and indurating said discrete green pellets to produce hardened heat transfer bodies.

This invention is also embodied in the process of educting organic values from such naturally occurring hydrocarbonaceous materials utilizing as the heat transfer medium bodies formed from the inorganic matrix of a naturally occurring hydrocarbonaceous material.

Generally described, the invention comprises the following steps for producing a heat transfer body. A supply of spent oil shale is conveniently utilized as the starting material in the preferred embodiment of the present invention, although naturally occurring oil shale may as well be used. The spent oil shale is initially conditioned by mixing with moisture such as by passing through a water fed screw conveyor, and formed into discrete particles or pelletized by use of an inclined pan as illustrated in Patent No. 2,947,026. For the reasons stated above spent oil shale is preferred. This product is conveniently submitted to retorting on a traveling grate of either the straight line or annular type by depositing a bed of such spent shale on the traveling grate to a predetermined depth, e.g., from a few inches (4 inches to 36 inches) or more in depth. Also deposited on the grate, prior to deposition of the oil shale is a layer of refractory material to protect the grate. The burden is submitted to treatment with hot gases passed through the bed, preferably air. Carbonaceous residue remaining in the spent shale provides a fuel source within the body of the spent shale burden which contributes heat values to the gases and enables elevation of the temperature to a point substantially in excess of the oil educting temperature (approximately 800° F.), for example in the range of from about 1000° F. to 2200° F. Under these conditions, the siliceous and carbonaceous residue of which the oil shale matrix is essentially composed, undergoes bloating due to the presence of entrapped organic materials and partial decomposition of inorganic carbonates yielding gaseous materials. When the matrix itself is at or near the softening temperature i.e., 1800° F. to 2200° F., it is readily expander by the gases, e.g. carbon dioxide, being evolved. In the case of coke, such gaseous evolution will not be encountered to the degree it is in the case of oil shale. The product of the process thus far is a decarbonized and degassed sintered particle of relatively low density. Because of the relatively inexpensive manner in which it is produced, the particle may be of use, without further processing as a transfer medium.

After the bloating operation, when a denser particle is desired, the hot bloated shale is cooled and crushed to provide an granular material capable of being pelletized. The particle is again conditioned by mixing with water, and formed into discrete particles, in a conventional pelletizing apparatus e.g. a revolving drum pelletizer or an inclined rotating pan. The usual particle size for such pelletizing is conveniently within the range of from 20 to 200 mesh (Tyler Screen Series). After each pelletizing operation, the refractory, hearth material is recycled for reuse.

Depending upon the speed of rotation, the moisture content, the slope of the pan, etc., the size of the green or moist pellets can be controlled so that the pellets exiting from this operation are of remarkably uniform diameter.

The resulting green pellets are then deposited as a burden upon a traveling grate machine of the type previously employed, either stright line or annular and again submitted to temperatures sufficient to indurate the green pellets to produce hardened dry heat transfer bodies. Hot gases are employed as the heat transfer medium to effect induration, and the temperature of the burden is allowed to reach a maximum temperature which is just below the fusion point of the indurated pellets, and in the region of temperature where the pellets will ultimately be heated for use in the process of educting organic material from naturally occurring hydrocarbonaceous materials.

The pellets exiting from the traveling grate machine in hot condition are a high density sintered product and may then be utilized directly for admixture with raw hydrocarbonaceous material for the purpose of extracting the organic values therefrom.

When the raw hydrocarbonaceous material is oil shale, it is conveniently crushed to a size within the range specified in the aforesaid Patent No. 3,020,209 and the hot heat transfer bodies admixed therewith in the same proportions as indicated in said patent. The resultant composite is passed into a furnace and the organic material containing gases evolving therefrom conveyed away and further treated to condense therefrom shale oil.

The resultant material exiting from the furnace process then is a composition which for all practical purposes is that of spent shale. No effort need be made to attempt to recover the heat transfer bodies, but a portion of the spent residue may be reworked in accordance with the process outlined in the annexed flow sheet to produce heat transfer bodies for the next batch of hydrocarbonaceous material to be treated. That portion of the spent shale which is not utilized in the production of additional heat transfer bodies is then conveyed to a disposal site, or a storage site where it may be utilized as noted in the production of additional heat transfer bodies or in the production of expanded material for use in forming lightweight aggregates. In either event, the composition of the discharge material is essentially the same without contamination by foreign matter introduced with the heat transfer bodies as is the case with prior art processes.

Other methods for the preparation of a heat transfer medium are described in more detail hereinafter.

In many instances it will be found desirable to admix with the granular bloated oil shale a binding agent such as bentonite. The amount of such binder will generally range from about 5 percent by weight of the entire mixture to about 35 percent of the entire mixture. For most purposes 5 percent will be found to be sufficient when such an admixture is utilized. Mixing apparatus is provided (e.g. a ribbon blender), and the blend conveyed to the pelletizing apparatus. While en route to the pelletizer moisture may be added as aforementioned. Usually the amount of such moisture added to the blend in the course of conveying it to the pelletizing apparatus is insufficient for proper balling or pelletizing, and it is necessary at the pelletizing apparatus to make further adjustment upwardly of the amount of moisture in order to attain proper balling of the aggregate.

Referring more particularly to the details of the process, there is shown in FIG. 1 of the drawings a schematic flow chart for a sintering process of the present invention. Spent shale as produced by any process involving the removal of hydrocarbons from an inorganic matrix is contained in a hopper 10 until ready for use, from whence it is passed through a conditioner 11 allowing the incorporation of moisture. The conditioner is shown to be a ribbon blender 12, but may be any other suitable means of conditioner, allowing the incorporation of moisture into the spent shale in order to make the mixture amenable to the formation of discrete particles or pellets.

Subsequent to the conditioning, the spent shale mixture is passed to a pelletizer 13 shown to be a revolving, vertical pan as described in Patent No. 2,947,026. The spent shale is therein formed into pellets and advanced to a traveling grate 14 where it is deposited on a hearth layer 15 on the grate and sintered. The hearth layer protects the grate from the hot gases which are passed through the burden and grate and discharged from the system. The gases are most commonly of a temperature of about 2100° F. and the burden is subjected to the hot gases (from a source not shown) while within the heating area 16 for a period of time of from about 5 to 8 minutes.

The gases are drawn through the burden by exhaust pump 17 in the direction of the arrows and then discharged from the system. The burden, upon reaching the end of the conveyor, is caught by a separator 18 wherein the hearth layers are separated from the sintered portion and the hearth layer recycled for reuse. The sintered product, an expanded particle of irregular cross-section and from about 1/8" to 3/4" in diameter, is collected at 19 and is now considered decarbonized and degassed and ready for use as a heat transfer medium. The product has a bulk density of about 10 to 50 pounds per cubic foot.

Figure 2:
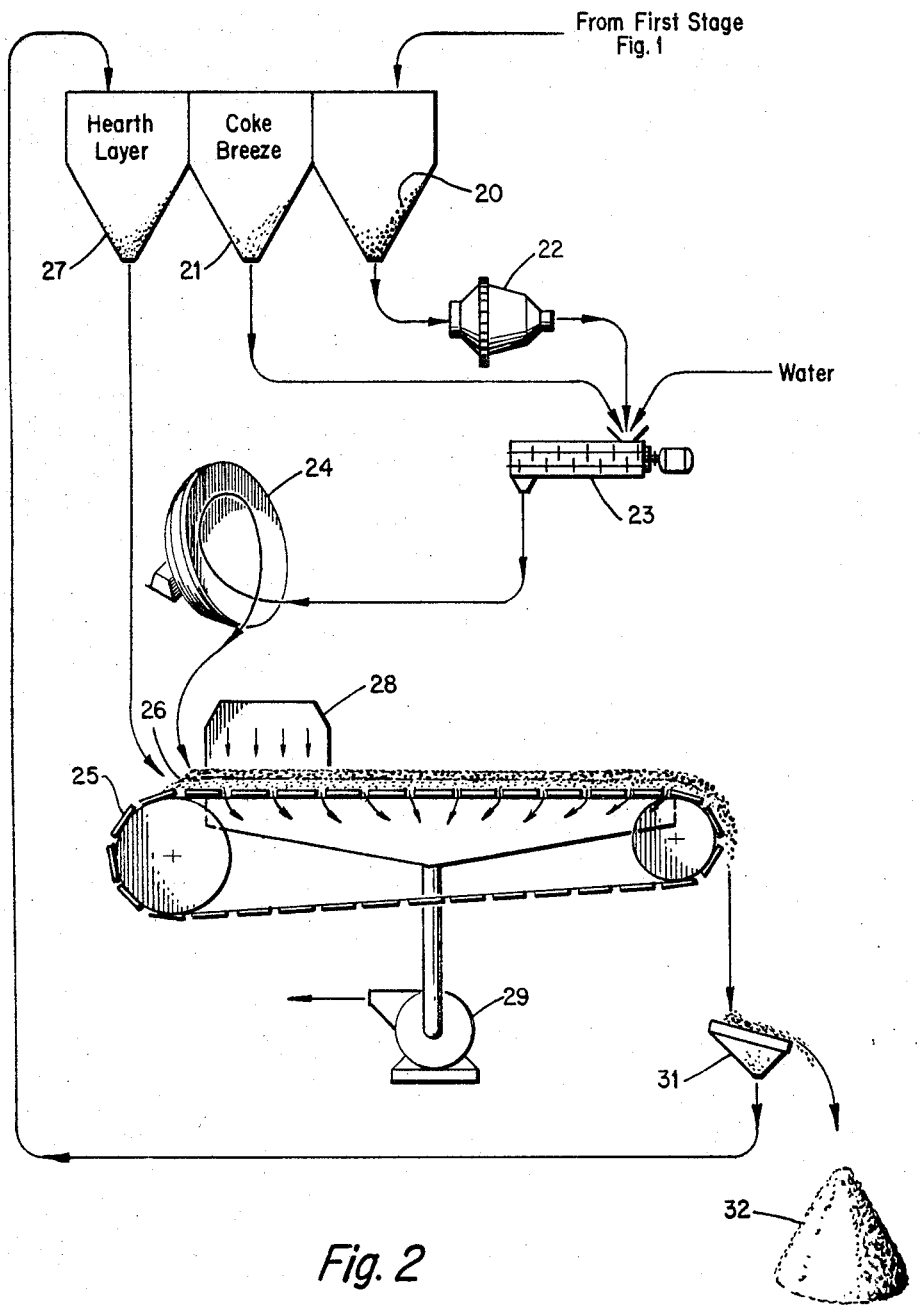

By another embodiment of the present invention, this product can now be densified as illustrated in FIG. 2. Densification is achieved by initially crushing the decarbonized and degassed product, stored temporarily in bin 20, and mixing it with coke breeze from bin 21. The crushing operation is shown as being conducted in a ball mill 22. After crushing, the pulverized product is advanced to a conditioner 23 to be combined and mixed with water, then to a revolving pan 24, as aforedescribed. The product is again a discrete particle, or pellet, all of uniform size. The pellets are advanced to a grate 25 upon which has previously been deposited a layer of hearth material 26 from bin 27. Hot gases are passed through the burden on the grate while within the heating area 28 and drawn by means of a vacuum apparatus through the grate and discharged from the system by pump 29. The hearth layer is recycled for reuse and the dried pellets are advanced to a separator 31 and thence to a collecting station 32 where they remain until ready for use. The product has a density of above about 70 pounds per cubic foot.

Figure 3:
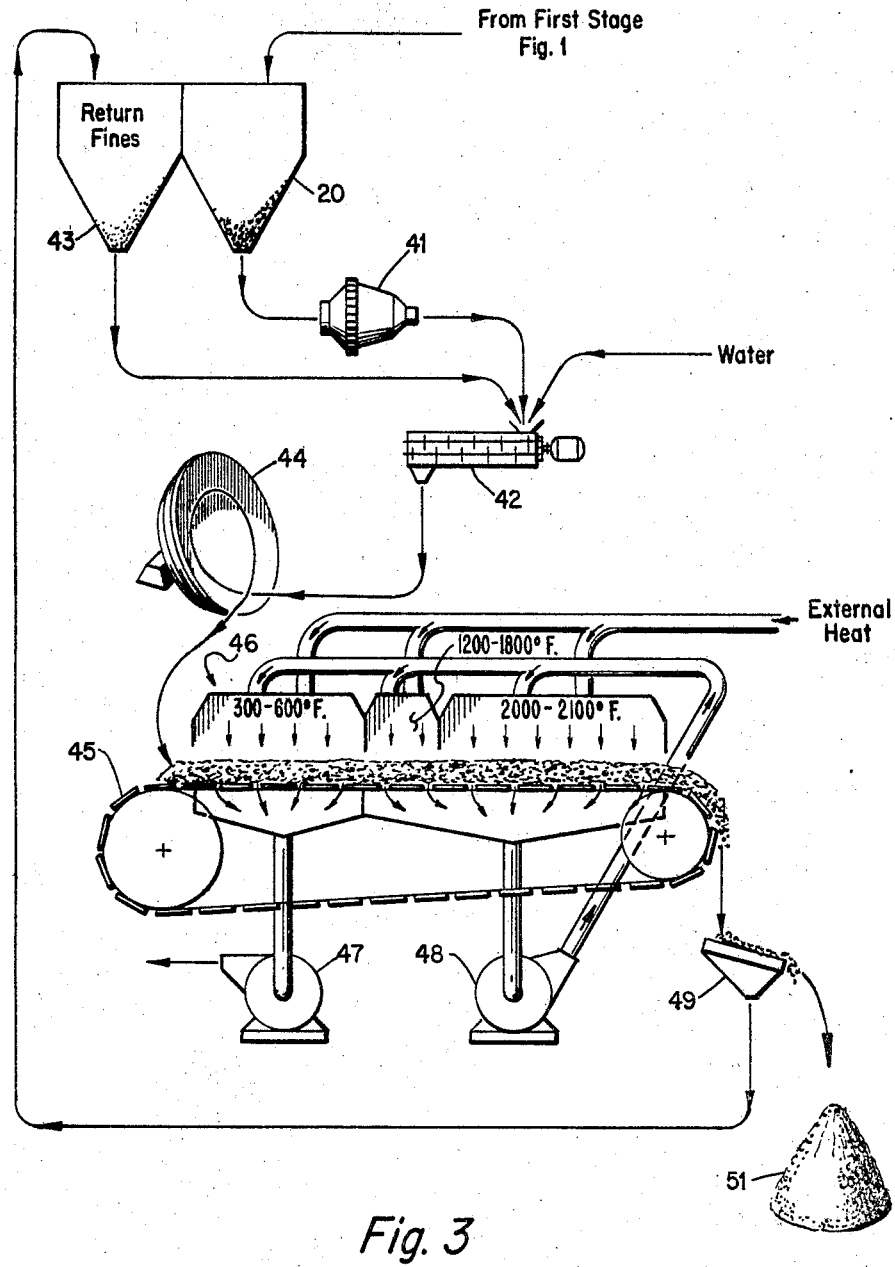

As shown in FIG. 3, the process can be modified to allow for the preparation of pellets by other methods. Spent shale as prepared by the process outlined in relation to FIG. 1 and stored temporarily in bin 20 is advanced to a ball mill 41, to a conditioner 42 where it is mixed with water and process fines of less than about 1/8" in diameter from bin 43, and advanced to a pelletizer 44 before again being subjected to high temperatures on a traveling grate 45. The pellets are passed through a three-compartment heating chamber generally shown at 46. In three separate compartments of the chamber, the pellets are heated to temperature ranges of from about 300° F.–600° F.; from about 1200° F.–1800° F. and from about 2000° F.–2100° F., respectively. The first compartment is used to dry the pellets, the second to preheat the pellets and the third to fire the pellets. The length of time in each compartment is about 9, 11 and 13 minutes, respectively. Gases from the first chamber are exhausted from the system by exhaust pump 47, while gases from the second and third chambers are recycled for reuse by means of pump 48. The heated pellets, upon their being discharged from the heating chamber, are now a dense material, ready for use as a heat transfer medium. The fines of less than about 1/8" in diameter are separated from the pellets by use of separator 49 and recycled for reuse. The pellets are deposited at collecting station 51 until used as a heat transfer medium.

Figure 4:
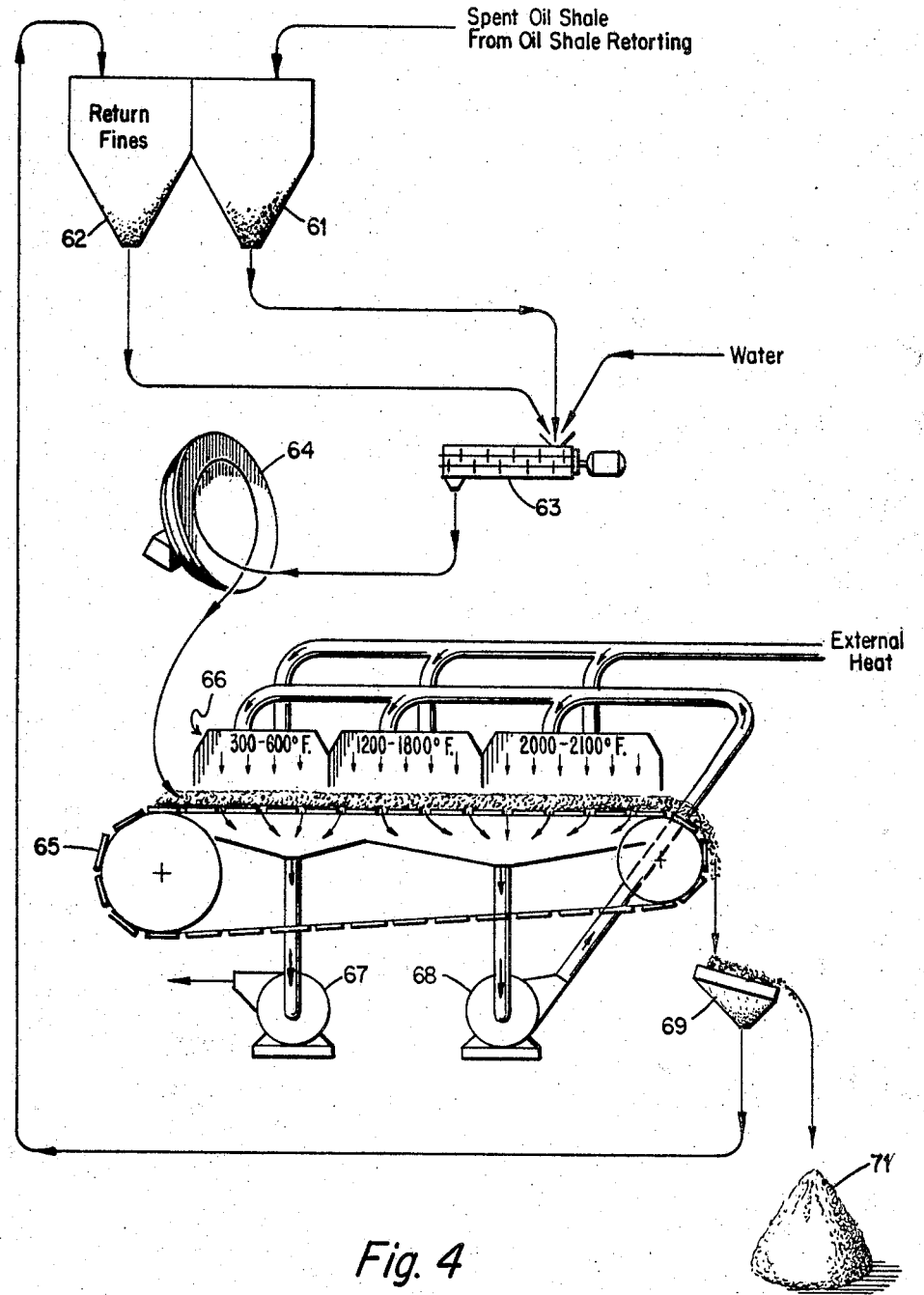

Another embodiment of the present invention entails the preparation of a low density pellet under circumstances in which economic considerations prohibit the use of the high density pellets. As shown in FIG. 4, there is presented a process whereby spent shale from bin 61 is combined with water and spent fines of less than about 1/8" in diameter from bin 62, passed through a conditioner 63 and to pelletizer 64 before being advanced to traveling grate 65 positioned within a three-compartment heating chamber generally shown at 66 where it is subjected to gases of temperature ranges of from about 300° F. to 600° F. for about 9 minutes, from about 1200° F. to 1800° F. for about 11 minutes and from about 2000° F. to 2100° F. for about 13 minutes in each of the compartments. The hot gases from the first compartment are discharged from the system by means of pump 67, while the gases from the second and third compartments are recycled for reuse by pump 68. The pellets, upon passing from the heating chamber and being separated from the fines by means of separator 69, are deposited at the collecting station 71.

As indicated above, the conditions of this invention may be derived by carrying out the same procedures with respect to other hydrocarbonaceous materials than the exemplified oil shale. Coke, sand, silicia, etc., may be treated in like fashion to produce the novel heat transfer bodies of this invention.

The heat transfer bodies as prepared by the method of the present invention have a high conductivity of thermal energy, abundant surface for solid-to-solid contact, moderately high strength, high resistance to thermal degradation and high density. The high density pellets as described herein have a bulk density of about 82.2 pounds per cubic foot, a crush strength of about 450 pounds and a Tumble index of about 90.2 for a 3 mesh screen and 4.8 for a 28 mesh screen. Tumble index is measured by placing 25 pounds of product in a standard ASTM coke tumbler drum and rotating for 200 revloutions at 25 r.p.m. The quantity retained on a 28 mesh screen and the quantity retained on a 3 mesh screen is then determined. The low density particles have a bulk density of about 35.2 pounds per cubic foot.

What is claimed is:

1. A process for the preparation of a hardened, dense heat transfer medium from spent oil shale having a bulk density in excess of about 70 pounds per cubic foot comprising the steps of sintering spent oil shale at a temperature of from 1800° F. to 2200° F. to form expanded discrete particles, crushing the expanded shale, conditioning the shale by adding binder to the expanded material, forming the conditioned spent shale into pellets, depositing the pellets upon a conveyor, heating and indurating the pellets to form a hardened dense product.

2. A process for the preparation of a high density oil shale pellet having a bulk density in excess of about 70 pounds per cubic foot comprising sintering spent shale at a temperature of from 1800° F. to 2200° F., crushing the sintered shale, conditioning the crushed shale by combining it with water, forming the mixture into pellets, and heating the pellets in a stepwise process in a temperature range of from about 300° F. to 2100° F. for a period of time sufficient to harden the pellets into a heat transfer medium.

3. The process of claim 2 wherein the crushed shale is heated stepwise by passing through treating zones successively at temperatures in the ranges of from about 300° F.–600° F., from about 1200° F.–1800° F. and from about 2000° F.–2100° F.

4. A process for the preparation of a heat transfer medium from spent oil shale, comprising sintering the spent shale to a temperature in the range of about 1800° F. to 2200° F., crushing the sintered spent shale to a granular material, pelletizing the granular material to form pellets, heating the pellets at a temperature in the range of from about 1000° F. to 2000° F. to form hard, discrete bodies having a bulk density in excess of 70 pounds per cubic foot and useful as a heat transfer medium.

5. A process for the preparation of a dense, hardened heat transfer medium from spent oil shale, comprising crushing the spent oil shale, admixing moisture with the spent oil shale, forming the mixture into discrete pellets, charging the discrete pellets to a traveling grate to form a burden thereon, heating the burden to a temperature of from 1800° F. to 2200° F. to rid the pellets of any gaseous material, crushing the pellets to granular form, mixing the granular material with moisture, pelletizing the moist mixture, forming a burden thereof on a traveling grate, and indurating the pellets by heating them to a temperature of from 1000° F. to 2000° F.

References Cited

UNITED STATES PATENTS

| | | | |
|---|---|---|---|
| Re. 16,750 | 9/1927 | Hayde | 106—71 |
| 1,707,395 | 4/1929 | Hayde | 264—44 XR |
| 1,877,138 | 9/1932 | Lee et al. | 106—40 |
| 2,035,845 | 3/1936 | Stanton | 106—40 |
| 2,533,899 | 12/1950 | Ryner | 264—43 |
| 2,627,642 | 2/1953 | Osborne | 106—40 XR |
| 2,676,892 | 4/1954 | McLaughlin | 106—40 XR |
| 2,693,017 | 11/1954 | Czarnecki et al. | 264—43 |
| 2,946,112 | 7/1960 | Tucker et al. | 264—117 XR |
| 2,799,074 | 7/1957 | Garloni | 264—43 |
| 3,218,180 | 11/1965 | Sjostrand | 106—67 XR |
| 3,328,187 | 6/1967 | Ban. | |

PHILIP E. ANDERSON, *Primary Examiner.*

U.S. Cl. X.R.

106—122, 288; 264—37, 64, 66